United States Patent
Dimpelfeld et al.

(10) Patent No.: US 11,203,966 B1
(45) Date of Patent: Dec. 21, 2021

(54) CIRCULAR SAMPLING DEVICE FOR AN EXHAUST GAS SENSOR

(71) Applicant: Faurecia Emissions Control Technologies, USA, LLC, Columbus, IN (US)

(72) Inventors: Philip Dimpelfeld, Columbus, IN (US); Aejaz Ahmed, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 17/039,025

(22) Filed: Sep. 30, 2020

(51) Int. Cl.
*F01N 13/08* (2010.01)
*F01N 11/00* (2006.01)

(52) U.S. Cl.
CPC ............ *F01N 13/08* (2013.01); *F01N 11/007* (2013.01)

(58) Field of Classification Search
CPC ....... F01N 2560/026; F01N 2900/0416; F01N 2240/20; G01D 11/245; G01N 33/0009
See application file for complete search history.

(56) References Cited

U.S. PATENT DOCUMENTS

| | | | |
|---|---|---|---|
| 7,448,207 B2 | 11/2008 | Jozsa | |
| 7,964,163 B2 | 6/2011 | Johannessen | |
| 8,551,219 B2 | 10/2013 | Johannessen | |
| 8,756,913 B2 * | 6/2014 | Liu | F01N 3/2066 60/276 |
| 9,010,091 B2 | 4/2015 | Johannessen | |
| 9,346,017 B2 | 5/2016 | Greber | |
| 9,932,878 B2 * | 4/2018 | Zhang | F01N 11/007 |
| 10,036,291 B2 | 7/2018 | Kotrba | |
| 10,392,989 B1 * | 8/2019 | Tucker | B01D 53/9431 |
| 2004/0149595 A1 * | 8/2004 | Moore | F01N 11/007 205/784.5 |
| 2011/0219745 A1 | 9/2011 | Griffin | |
| 2015/0121855 A1 * | 5/2015 | Munnannur | F01N 3/208 60/295 |
| 2016/0305297 A1 * | 10/2016 | Wadke | G01N 33/004 |
| 2017/0044956 A1 * | 2/2017 | Zhang | B01F 3/02 |
| 2017/0087515 A1 | 3/2017 | Huang | |
| 2017/0226916 A1 * | 8/2017 | Zhang | F01N 13/008 |

FOREIGN PATENT DOCUMENTS

CN 109738598 5/2019
DE 102011078181 A1 1/2013

* cited by examiner

*Primary Examiner* — Anthony Ayala Delgado
(74) *Attorney, Agent, or Firm* — Barnes & Thornburg LLP

(57) ABSTRACT

An exhaust system includes an exhaust duct having an internal surface defining an exhaust gas passage extending along an axis. At least one sensor opening is in the exhaust duct and is configured to receive an exhaust gas sensor. A wall is positioned within the exhaust gas passage to extend at least partially around the at least one sensor opening. The wall has an inner wall surface defining an internal volume. An inlet pipe ring is in fluid communication with the internal volume, and the inlet pipe ring extends from a first end open to the internal volume to a second end this is also in fluid communication with the internal volume. The inlet pipe ring includes a plurality of inlet apertures.

20 Claims, 5 Drawing Sheets

CIRCULAR SAMPLING DEVICE FOR AN EXHAUST GAS SENSOR

TECHNICAL FIELD

This disclosure relates generally to a sampling device for an exhaust gas sensor located within an exhaust duct.

BACKGROUND

Vehicles include exhaust systems that utilize catalysts to remove contaminants from engine exhaust gases. One example of such a catalyst is a Selective Catalytic Reduction (SCR) catalyst where nitrogen oxide (NOx) reduction reactions take place in an oxidizing atmosphere. Levels of NOx are reduced using ammonia as a reductant within a catalyst system. A reduction chemical reaction occurs when a reducing agent reacts with NOx to convert the pollutants into nitrogen, water, and small amounts of CO2. A NOx sensor is used to measure residual NOx content of the exhaust gas exiting the SCR catalyst.

SUMMARY

An exhaust system according to an exemplary aspect of the present disclosure includes, among other things, an exhaust duct having an internal surface defining an exhaust gas passage extending along an axis. At least one sensor opening is in the exhaust duct and is configured to receive an exhaust gas sensor. A wall is positioned within the exhaust gas passage to extend at least partially around the at least one sensor opening. The wall has an inner wall surface defining an internal volume. An inlet pipe ring is in fluid communication with the internal volume, and the inlet pipe ring extends from a first end open to the internal volume to a second end this is also in fluid communication with the internal volume. The inlet pipe ring includes a plurality of inlet apertures.

In a further non-limiting embodiment of the foregoing system, the exhaust duct has a cross-section extending across the axis, and wherein the inlet pipe ring extends across the cross-section to guide exhaust gas from different regions of the cross-section toward the at least one sensor opening within the internal volume.

In a further non-limiting embodiment of any of the foregoing systems, the wall includes at least one inlet opening to direct exhaust flow into the internal volume and at least one outlet opening to direct exhaust flow out of the internal volume.

In a further non-limiting embodiment of any of the foregoing systems, the wall extends completely around the at least one sensor opening.

An exhaust system, according to yet another exemplary aspect of the present disclosure includes, among other things, an exhaust duct defining an exhaust gas passage extending along an axis and having a cross-section extending across the axis. The exhaust duct includes at least one sensor opening, and a NOx sensor is mounted within the sensor opening and extends to a sensor tip that is within the exhaust gas passage. A wall is positioned within the exhaust gas passage to extend at least partially around the sensor tip, with the wall having an inner wall surface defining an internal volume. The inlet pipe ring is in fluid communication with the internal volume, and the inlet pipe ring extends from a first end open to the internal volume to a second end this is also in fluid communication with the internal volume. The inlet pipe ring includes a plurality of inlet apertures.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
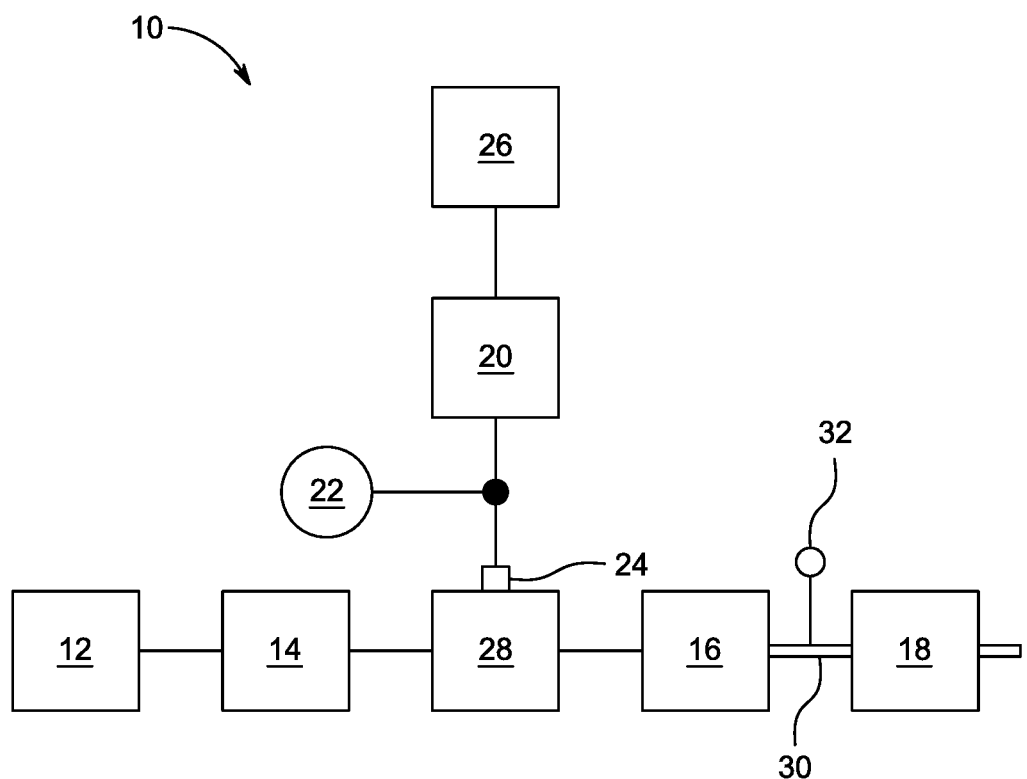
FIG. 1 illustrates a schematic view of a vehicle exhaust system.

This disclosure details an exemplary sampling device that directs exhaust gas toward a sensor tip located within an exhaust duct. FIG. 1 shows a vehicle exhaust system 10 that conducts hot exhaust gases generated by an engine 12 through various upstream exhaust components 14 to reduce emission and control noise as known. In one example configuration, the upstream exhaust component 14 can comprise a diesel oxidation catalyst (DOC) and/or a diesel particulate filter (DPF) that is used to remove contaminants from the exhaust gas as known. Downstream of these upstream exhaust components 14 is one or more additional exhaust gas aftertreatment components 16 that also remove contaminants from the exhaust gas as known. Exhaust gases exiting the exhaust gas aftertreatment components 16 are conducted to downstream exhaust components 18 such as resonators, mufflers, etc., and eventually exit to atmosphere. These upstream 14 and downstream 18 components can be mounted in various different configurations and combinations dependent upon vehicle application and available packaging space.

In one example configuration, an injection system 20 is used to inject a reducing agent, such as a solution of urea and water for example, into the exhaust gas stream upstream from the exhaust gas aftertreatment components 16. The injection system 20 includes a fluid supply 22, a doser/injector 24, and a controller 26 that controls injection of the urea as known. An optional mixer 28 can also be positioned upstream of the exhaust gas aftertreatment components 16 such that the mixer 28 can mix the injected reducing agent and exhaust gas nearly thoroughly together prior to entering the exhaust gas aftertreatment components 16.

In one example configuration, the exhaust gas aftertreatment component 16 comprises at least one Selective Catalytic Reduction (SCR) catalyst where the reducing agent reacts with NOx to convert the pollutants into nitrogen, water, and small amounts of CO2. Exhaust gas exiting the SCR catalyst enters an exhaust pipe or duct 30 and an exhaust gas sensor 32, e.g. a NOx sensor, is used to measure residual NOx content of the exhaust gas exiting the SCR catalyst. The structure and operation of the NOx sensor 32 is known, and any type of NOx sensor can be used to measure the residual NOx content of the exhaust gas.

Figure 2A:
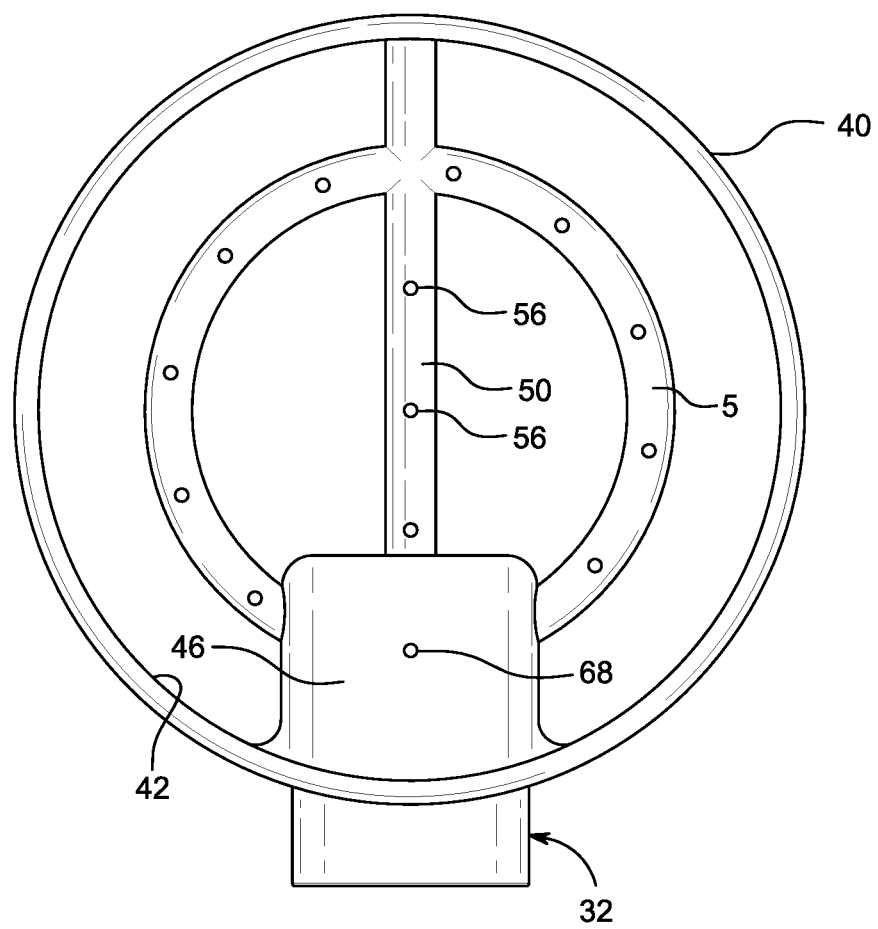
FIG. 2A is an inlet end view of a sampling device with an inlet pipe ring and a center inlet pipe as used in the system of FIG. 1.
Figure 2B:
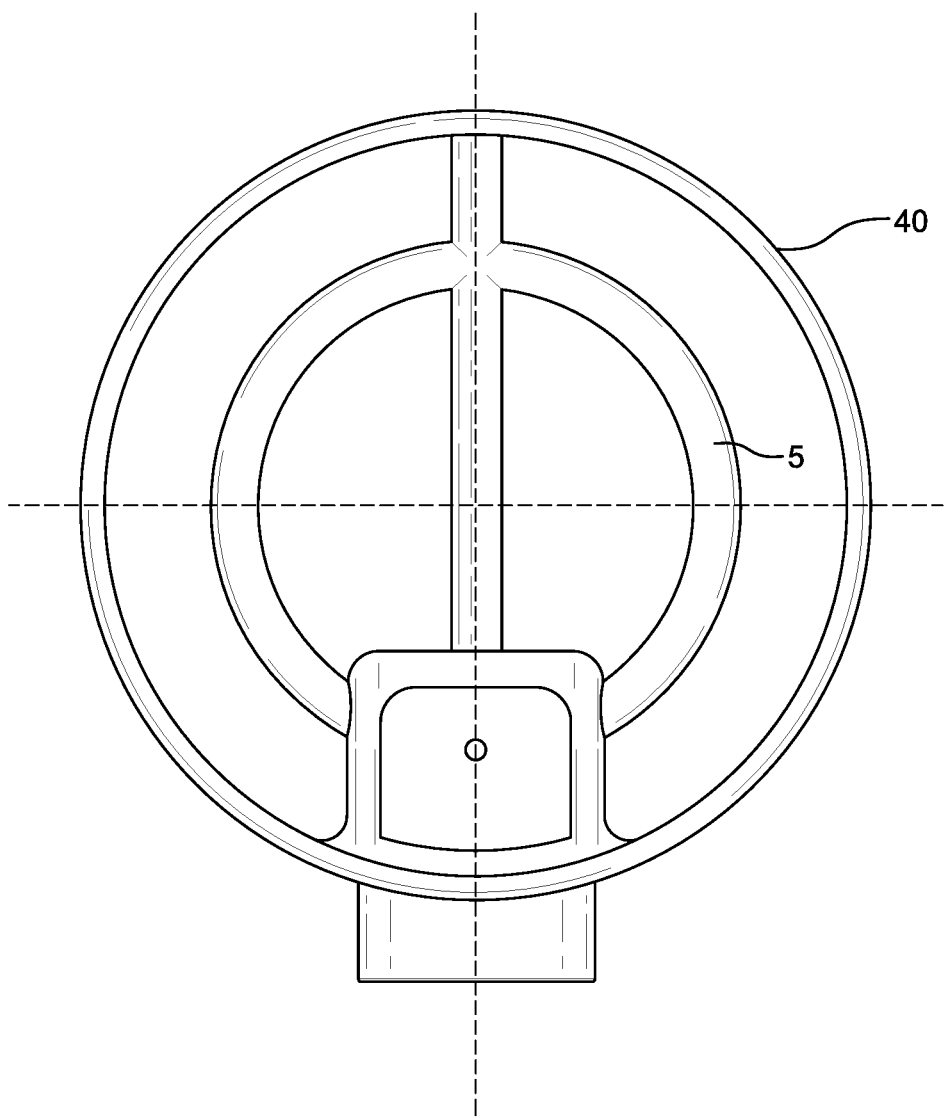
FIG. 2B is an outlet end view of the sampling device of FIG. 2A.
Figure 2C:
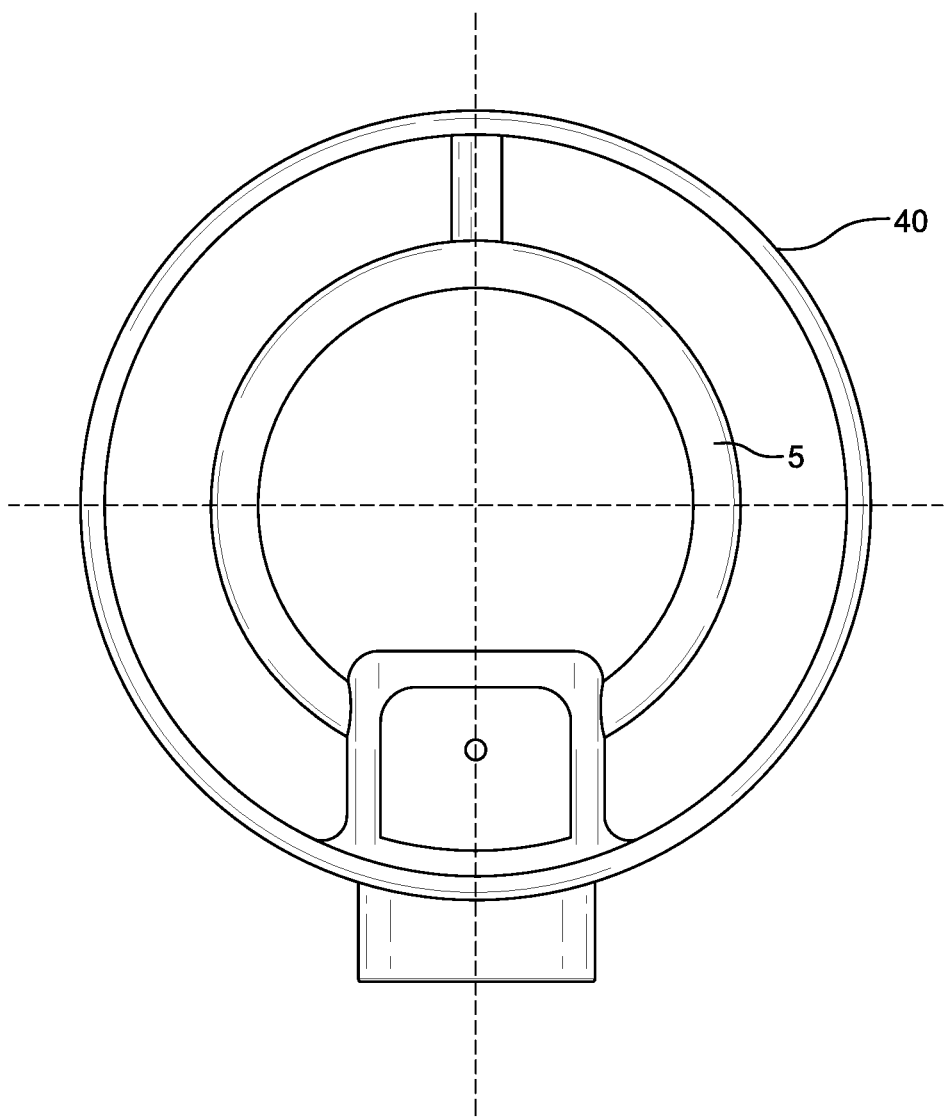
FIG. 2C is an outlet end view of another embodiment of a sampling device with no center pipe of as used in the system of FIG. 1.
Figure 3:
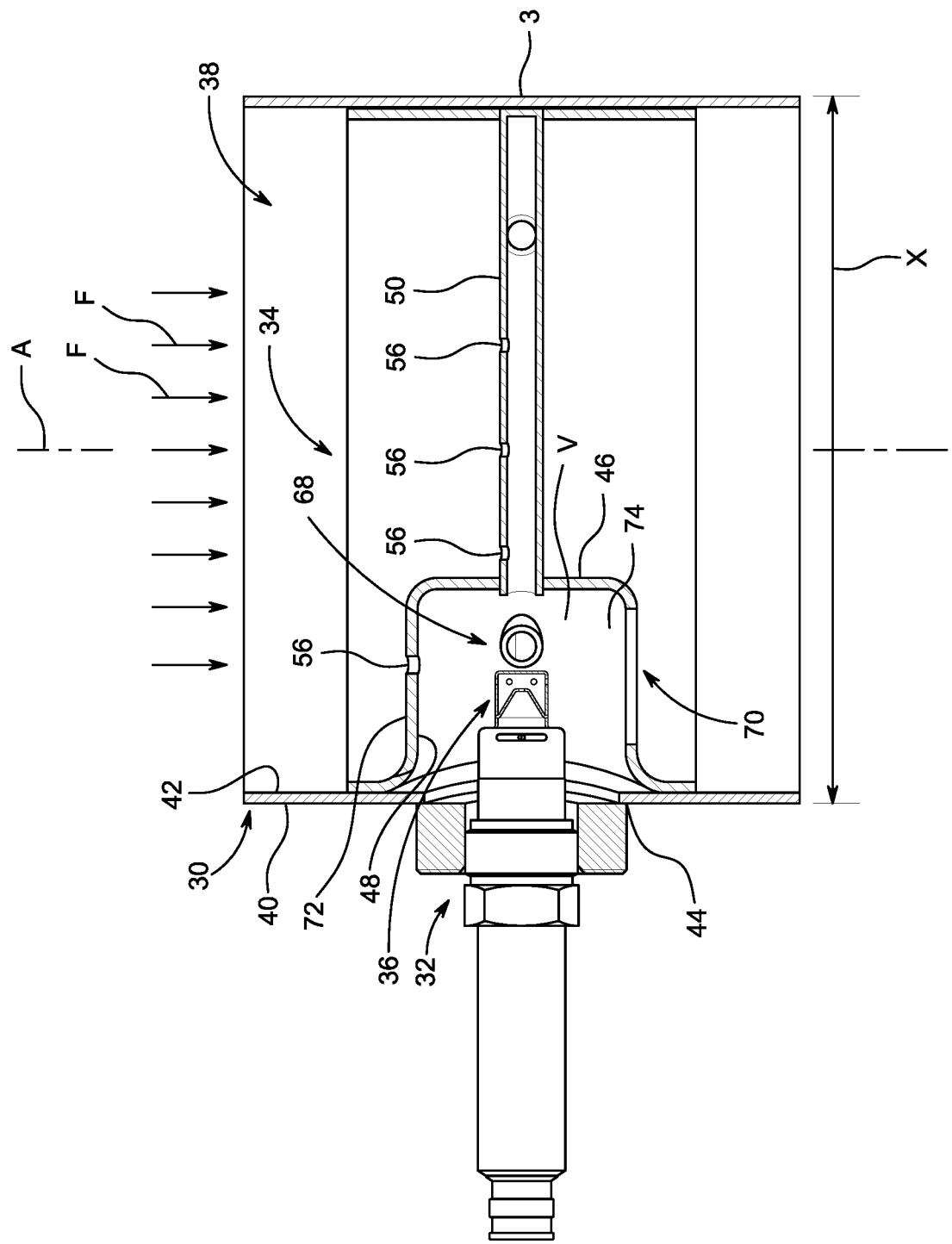
FIG. 3 is a schematic side view of the sampling device of FIG. 2A but only showing the center inlet pipe for purposes of clarity.

As shown in FIGS. 2A-3, a sampling device 34 is used to direct exhaust gas toward a sensor tip 36 located within the exhaust duct 30. As shown in FIG. 3, the exhaust duct 30 defines an exhaust gas passage 38 extending along an axis A and having a cross-section X extending across the axis A. The exhaust duct 30 has an external surface 40 and an internal surface 42 that defines the exhaust gas passage 38. The exhaust duct 30 has at least one sensor opening 44 that extends through a wall thickness of the exhaust duct 30 from the external surface 40 to the internal surface 42.

The NOx sensor 32 is mounted within the sensor opening 44 and extends to the sensor tip 36 that is positioned within the exhaust gas passage 38. A wall 46 is positioned within the exhaust gas passage 38 to extend at least partially around the sensor opening 44 and the sensor tip 36. In one example, the wall 46 extends completely around the sensor opening 44 and the sensor tip 36. The wall has an inner wall surface 48 defining an internal volume V (FIG. 3). an inlet pipe ring 5 and a center inlet pipe 50 are in fluid communication with the internal volume V. The pipe ring 5 and the center inlet pipe 50 extends from a first end which is open to the internal volume V, and in the case of the center inlet pipe to a second end that is distal from the first end. The inlet pipe ring 5 extends from the first end to a second end that also is open to the internal volume V. The inlet pipe ring 5 and the inlet pipe 50 include a plurality of inlet apertures 56. In one example, the inlet apertures 56 are spaced apart from each other along a length of the inlet ring 5 and inlet pipe 50. In one example, the inlet apertures 56 face upstream to receive the exhaust flow F and a downstream side of the inlet ring 5 and inlet pipe 50 are free from apertures. The inlet apertures 56 receive the exhaust flow F and direct the exhaust gas up the ring 5 and pipe 50 toward the internal volume V.

In one example, the inlet pipe ring 5 is substantially circular, with the center inlet pipe 50 extending along the diameter of the inlet pipe ring 5 and extending past it (FIGS. 2A-B). Alternatively, the inlet pipe ring 5 may not have a center inlet pipe 50 extending across the diameter (FIG. 2C). While the inlet pipe ring 5 is shown to be circular, it can be any continuous shape starting and ending in fluid communication with the internal volume V. Preferably, the inlet pipe ring 5 is substantially the same shape as the cross section of the duct 30.

The center inlet pipe 50 has a length that extends from the first end to a second end. In one example, the center inlet pipe 50 is connected to the wall 46 at a discrete location. As such, the first end of the first inlet pipe is in fluid communication with the internal volume V, the first end of the inlet pipe ring 5 is in fluid communication with the internal volume V, and the second end of the inlet pipe ring 5 is in fluid communication with the internal volume V. In one example, the center inlet pipe 50 and inlet pipe ring 5 have lengths and diameters respectively that extend across the entirety of the cross-section X from the first end at the wall 46 to the second end at the internal surface 42 of the exhaust duct 30 opposite from the wall 46. This ensures more complete sampling across the entire section of the exhaust duct 30.

The wall 46 includes at least one inlet opening 68 (FIG. 2A) to direct exhaust flow into the internal volume V and at least one outlet opening 70 (FIG. 3) to direct exhaust flow out of the internal volume V. In one example, the inlet opening 68 is smaller in cross-sectional area than the outlet opening 70. FIGS. 2A-3 show examples where there is only one inlet opening 68 and only one outlet opening 70.

In one example, the wall 46 has an open end 72 that is connected directly to the internal surface 42 of the exhaust duct 30 around the sensor opening 44. An opposite end 74 of the wall 46 comprises an enclosed end. The wall 46 extends between the ends 72, 74 completely about the sensor opening 44 and tip 36, i.e. the wall 46 extends three hundred and sixty degrees about the tip 36. The inlet openings 68 are formed in the upstream side of the wall 46 and the outlet opening 70 is formed in the downstream side of the wall 46. The wall 46 is shaped to receive the exhaust gas flow exiting from the inlet tubes 50 into the internal volume V and facilitate guiding this input flow and the exhaust gas entering the inlet openings 68 past the sensor tip 36, and then to the outlet opening 70.

In one example, the elements of the sampling device 34 are made from a stamping; however, other methods can also be used to form the device.

The sampling device 34 extends the inlet pipe 50 and the inlet ring 5 across the cross-section X to guide exhaust gas from different regions of the cross-section X into the internal volume V and toward the sensor tip 36. This improves exhaust gas sampling accuracy, as the sensor 32 is measuring residual NOx content that is representative of all of the exhaust gas in the exhaust gas stream and not just the exhaust gas that is close to the sensor tip 36. Additional inlet pipes 50 could be added if needed.

The sampling device 34 is easy to manufacture and install, and is more cost efficient compared to prior designs. Further, the sampling device 34 can be easily installed within existing systems without major changes. While the sampling device is shown as being used with a NOx sensor, it should be understood that it could be used with other types of exhaust gas sensors.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:
1. An exhaust system comprising:
   an exhaust duct having an internal surface defining an exhaust gas passage extending along an axis;
   at least one sensor opening in the exhaust duct that is configured to receive an exhaust gas sensor;
   a wall positioned within the exhaust gas passage to extend at least partially around the at least one sensor opening, the wall having an inner wall surface defining an internal volume; and
   an inlet pipe ring in fluid communication with the internal volume, wherein inlet pipe ring extends from a first end coupled to a first side of the wall and open to the internal volume, to a second end that is coupled to a second side of the wall opposite the first end and also open to the internal volume, and wherein the inlet pipe ring includes a plurality of inlet apertures.

2. The exhaust system according to claim 1, wherein the exhaust duct has a cross-section extending across the axis, and further comprising a centered inlet pipe that extends across the cross-section to guide exhaust gas from different regions of the cross-section toward the at least one sensor opening within the internal volume.

3. The exhaust system according to claim 2, wherein the center inlet pipe extends into the exhaust duct wall.

4. The exhaust system according to claim 1, wherein the inlet pipe ring is substantially circular.

5. The exhaust system according to claim 1, the inlet pipe ring is substantially the same shape as the cross section of the exhaust duct.

6. An exhaust system comprising:
an exhaust duct having an internal surface defining an exhaust gas passage extending along an axis;
at least one sensor opening in the exhaust duct that is configured to receive an exhaust gas sensor;
a wall positioned within the exhaust gas passage to extend at least partially around the at least one sensor opening, the wall having an inner wall surface defining an internal volume; and
an inlet pipe ring in fluid communication with the internal volume, wherein inlet pipe ring extends from a first end open to the internal volume, to a second end that is also open to the internal volume, and wherein the inlet pipe ring includes a plurality of inlet apertures,
wherein the wall includes at least one inlet opening located upstream of the inlet pipe ring to direct exhaust flow into the internal volume and at least one outlet opening located downstream of the inlet pipe ring to direct exhaust flow out of the internal volume.

7. The exhaust system according to claim 6, wherein the wall extends completely around the at least one sensor opening.

8. The exhaust system according to claim 2, wherein the inlet pipe ring and the center inlet pipe are of the same cross section.

9. The exhaust system according to claim 2, wherein the center inlet pipe is centered on the inlet pipe ring.

10. The exhaust system according to claim 1, wherein the inlet pipe ring defines a path within the exhaust duct that defines an internal aperture.

11. The exhaust system according to claim 1, wherein the at least one sensor comprises a NOx sensor.

12. An exhaust system comprising:
an exhaust duct defining an exhaust gas passage extending along an axis and having a cross-section extending across the axis, and wherein the exhaust duct includes at least one sensor opening;
a NOx sensor mounted within the sensor opening and extending to a sensor tip that is within the exhaust gas passage;
a wall positioned within the exhaust gas passage to extend at least partially around the sensor tip, the wall having an inner wall surface defining an internal volume; and
an inlet pipe ring in fluid communication with the internal volume, wherein inlet pipe ring extends from a first end coupled to a first side of the wall and open to the internal volume, to a second end that is coupled to a second side of the wall opposite the first end and also open to the internal volume, and wherein the inlet pipe ring includes a plurality of inlet apertures.

13. The exhaust system according to claim 12, wherein the cross-section of the exhaust duct defines a plane that is perpendicular to the axis, and wherein a centered inlet pipe extends transverse to the plane.

14. The exhaust system according to claim 12, wherein the exhaust duct has a cross-section extending across the axis, and further comprising a centered inlet pipe that extends across the cross-section to guide exhaust gas from different regions of the cross-section toward the at least one sensor opening within the internal volume.

15. The exhaust system according to claim 12, wherein the inlet pipe ring is substantially circular.

16. The exhaust system according to claim 2, wherein the inlet pipe ring and the center inlet pipe are of the same cross section.

17. The exhaust system according to claim 15, wherein the inlet pipe ring is substantially the same shape as the cross-section of the exhaust duct.

18. The exhaust system according to claim 12, wherein the wall includes at least one inlet opening to direct exhaust flow into the internal volume and at least one outlet opening to direct exhaust flow out of the internal volume.

19. The exhaust system according to claim 18, wherein the wall extends completely around the sensor tip.

20. The exhaust system according to claim 12, wherein the inlet pipe ring extends across the cross-section to guide exhaust gas from different regions of the cross-section into the internal volume and toward the sensor tip.

* * * * *